United States Patent Office 2,864,814
Patented Dec. 16, 1958

2,864,814
METALLIFEROUS MONOAZO DYESTUFFS

Hans Ruckstuhl, Basel, Switzerland, assignor, by mesne assignments, to Saul & Co., Newark, N. J., as nominee of Fidelity Union Trust Company, executive trustee under Sandoz Trust No Drawing. Application July 12, 1956
Serial No. 597,339

1 Claim. (Cl. 260—147)

The present invention is a continuation-in-part application to my co-pending application Ser. No. 339,937, filed March 2, 1953 (now abandoned), and relates to valuable metalliferous azo dyestuffs of the pyrazolone series.

More particularly, the invention has especial relation to new metalliferous azo dyestuffs which, in the metal-free state, correspond to the formula

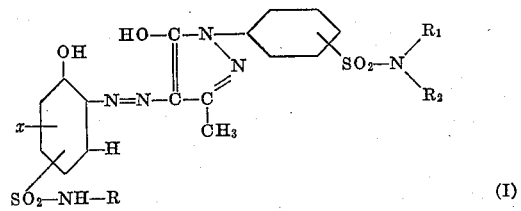

(I)

wherein $x$ stands for hydrogen, chlorine or methyl, R stands for lower alkyl, lower alkoxyalkyl or cyclohexyl, and each of $R_1$ and $R_2$ stands for lower alkyl or lower alkoxyalkyl, or form—together with N—the morpholyl or pyrrolidyl radical.

Two monoazo dyestuffs of the above-recited formula are so bound in complex union with the metal atom that the proportions of the number of metal atoms in complex union to the number of monoazo dyestuffs molecules is smaller than 1:1 and substantially 1:2.

The formula of the new metalliferous azo dyestuffs reads in the form of the 1:2 complex compounds as follows

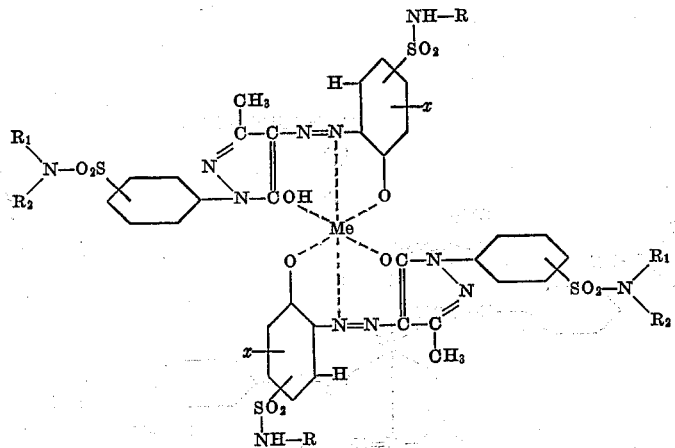

wherein $x$, R, $R_1$ and $R_2$ have the above-recited significances.

The metalliferous azo dyestuffs are prepared by coupling one mol of the diazo compound from a 1-hydroxy-2-aminobenzene-sulfonic acid amide which corresponds to the formula

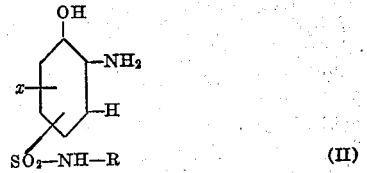

(II)

wherein $x$ and R have the above-recited significances, with one mol of a 1-phenyl-3-methyl-5-pyrazolone which corresponds to the formula

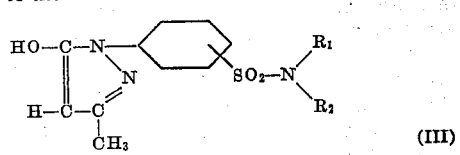

(III)

wherein $R_1$ and $R_2$ have the above-recited significances, and treating the resultant monoazo dyestuff with a metal-yielding agent, particularly a chromium- or cobalt-yielding agent.

The coupling of the diazo compounds with the pyrazolone is preferably carried out in alkaline medium. The working up and isolation of the obtained product can be carried out in per se conventional manner by filtering, washing and drying. The monoazo dyestuff can be converted into the corresponding water-soluble metal complex compound by per se conventional metallization methods, the metallization being preferably effected with salts of chromium, such for example as chromium sulfate, chromium formate, chromium acetate, potassium chromium sulfate, sodium bichromate or potassium bichromate, or with salts of bivalent cobalt, such for example as cobalt acetate, cobalt formate or cobalt sulfate, either in aqueous suspension or solution or in an organic medium or in a mixed aqueous organic medium, for example in a concentrated aqueous solution of an alkali metal salt of a low molecular aliphatic mono-carboxylic acid.

The good solubility of the new metalliferous azo dyestuffs in polar solvents such as acetone, dimethylformamide and tetrahydrofurane permits the new dyestuffs especially to be used for dyeing man-made fibers spun from organic solvents (e. g. cellulose acetate, polyacrylonitrile fibers, polyester fibers) and for pigmenting plastics and lacquers.

The following examples illustrate the invention, but are not intended to be limitative thereof. In the said examples, the parts are parts by weight, and the temperatures are expressed in degrees centigrade.

*Example 1*

20.2 parts of 1-hydroxy-2-aminobenzene-4-sulfonic acid methylamide are directly diazotized, in the presence of hydrochloric acid and ice, with 6.9 parts of sodium nitrite. The diazo compound is then coupled in aqueous solution, rendered alkaline with sodium carbonate, with 28.1 parts of 1-phenyl-3-methyl-5-pyrazolone-3'-sulfonic acid dimethylamide. The formed monoazo compound is filtered off and dried. It is a brown-red powder which dissolves with reddish yellow coloration in concentrated sulfuric acid and with orange coloration in dilute aqueous sodium carbonate solution.

In order to prepare the chromium complex compound in substance, 49.4 parts of the dried monoazo dyestuff are heated for 8 hours in 300 parts of formamide with 30 parts of ammonium chromium sulfate to 95–97°. The formed solution is allowed to cool to room temperature; then 600 parts of water are added thereto. The chromium-containing azo dyestuff precipitates and is filtered off and dried. It is a brown red powder which possesses a high solubility in polar organic solvents, especially in acetone. The color of the acetonic solution is reddish orange. In concentrated sulfuric acid the dyestuffs dissolves with yellow coloration.

The new chromium-containing azo dyestuffs corresponds to the formula

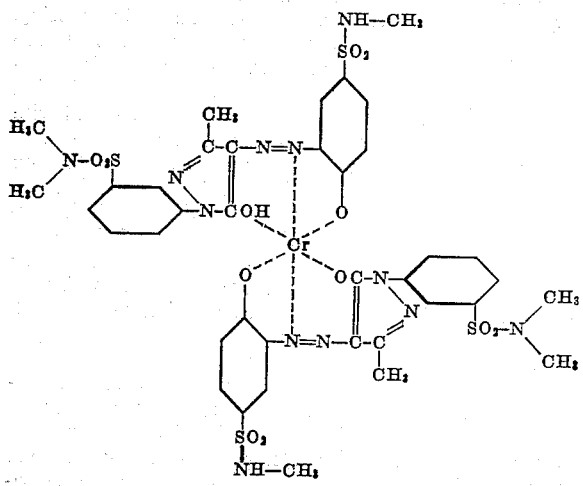

It dyes acetate rayon in the dope in reddish orange shades. The dope-dyed fibers possess outstanding fastness properties to light, gas fumes, washing and perspiration.

Similar dyestuffs are obtained when, in the present example, 1-hydroxy-2-aminobenzene-4-sulfonic acid methylamide, used for the preparation of the diazo compound, is replaced by an equivalent amount of 1-hydroxy-2-aminobenzene-4-sulfonic acid ethylamide 1-hydroxy-2-aminobenzene-4-sulfonic acid-(2'-methoxy)-ethylamide 1-hydroxy - 2 - aminobenzene - 4 - sulfonic acid-(2'-ethoxy)-ethylamide 1-hydroxy-2-aminobenzene-4-sulfonic acid propylamide 1-hydroxy-2-aminobenzene-4-sulfonic acid - (2'-methoxy)-propylamide 1-hydroxy - 2 - aminobenzene - 4 - sulfonic acid-(3'-methoxy)-propylamide 1-hydroxy-2-aminobenzene-4-sulfonic acid butylamide 1-hydroxy - 2 - aminobenzene - 4 - sulfonic acid-(3'-methoxy)-butylamide 1-hydroxy - 2 - aminobenzene - 4 - sulfonic acid - (4'-methoxy)-butylamide

*Example 2*

26.3 parts of 1-hydroxy-2-aminobenzene-4-sulfonic acid-(3'-methoxy)-propylamide are directly diazotized, in the presence of hydrochloric acid and ice, with 6.9 parts of sodium nitrite. The diazo compound is then coupled in aqueous solution, rendered alkaline with sodium carbonate, with 32.3 parts of 1-phenyl-3-methyl-5-pyrazolone-3'-sulfonic acid morpholide. The formed monoazo compound is filtered off and dried. It is a brown-red powder which dissolves with reddish yellow coloration in concentrated sulfuric acid and with orange coloration in dilute aqueous sodium carbonate solution.

In order to prepare the cobalt complex compound in substance, 59.7 parts of the dried monoazo dyestuff are heated for 20 hours together wtih 30 parts of crystallized sodium acetate and 25 parts of crystallized cobalt sulfate in 1000 parts of water to 80–85° C. The formed cobalt-containing azo dyestuff precipitates and is filtered off, washed with water and dried. It is a brown powder which possess a high solubility in polar organic solvents, especially acetone. The color of its acetonic solution is reddish yellow. In concentrated sulfuric acid the dyestuff dissolves with yellow coloration.

The new cobalt-containing azo dyestuff corresponds to the formula

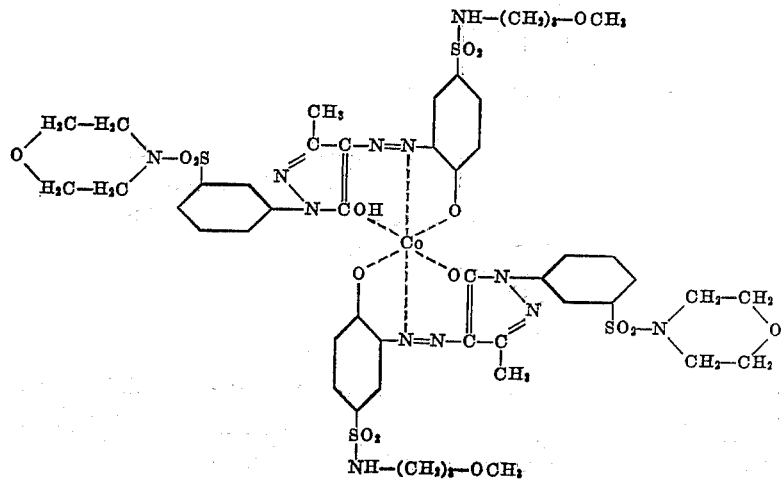

and dyes acetate rayon in the dope in reddish yellow shades. The dope-dyed fibers possess outstanding fastness properties to light, gas fumes, washing and perspiration.

Similar dyestuffs are obtained when, in the present Example, 1-phenyl-3-methyl-5-pyrazolone-3'-sulfonic acid morpholide, serving as an azo component, is replaced by an equivalent amount of 1-phenyl-3-methyl-5-pyrazolone-3'-sulfonic acid dimethylamide
1-phenyl-3-methyl-5-pyrazolone-2'-sulfonic acid dimethylamide
1-phenyl-3-methyl-5-pyrazolone-4'-sulfonic acid dimethylamide
1-phenyl-3-methyl-5-pyrazolone-3'-sulfonic acid diethylamide
1-phenyl-3-methyl-5-pyrazolone-2'-sulfonic acid diethylamide
1-phenyl-3-methyl-5-pyrazolone-4'-sulfonic acid diethylamide
1-phenyl-3-methyl-5-pyrazolone-3'-sulfonic acid dipropylamide
1-phenyl-3-methyl-5-pyrazolone-2'-sulfonic acid dipropylamide
1-phenyl-3-methyl-5-pyrazolone-4'-sulfonic acid dipropylamide
1-phenyl-3-methyl-5-pyrazolone-3'-sulfonic acid dibutylamide
1-phenyl-3-methyl-5-pyrazolone-2'-sulfonic acid dibutylamide
1-phenyl-3-methyl-5-pyrazolone-4'-sulfonic acid dibutylamide
1-phenyl-3-methyl-5-pyrazolone - 3' - di - [(2''-methoxy)-ethyl]-amide
1-phenyl-3-methyl-5-pyrazolone - 2' - di - [(2''-methoxy)-ethyl]-amide
1-phenyl-3-methyl-5-pyrazolone - 4' - di - [(2''-methoxy)-ethyl]-amide
1-phenyl-3-methyl-5-pyrazolone-3' - di - [(2'' - methoxy)-propyl]-amide
1-phenyl-3-methyl-5-pyrazolone-2' - di - [(2'' - methoxy)-propyl]-amide
1-phenyl-3-methyl-5-pyrazolone-4' - di - [(2'' - methoxy)-propyl]-amide
1-phenyl-3-methyl-5-pyrazolone - 3' - di - [(3''-methoxy)-propyl]-amide
1-phenyl-3-methyl-5-pyrazolone - 2' - di - [(3''-methoxy)-propyl]-amide
1-phenyl-3-methyl-5-pyrazolone-4' - di - [(3'' - methoxy)-propyl]-amide
1-phenyl-3-methyl-5-pyrazolone - 3' - di - [(3''-methoxy)-butyl]-amide
1-phenyl-3-methyl-5-pyrazolone - 2' - di - [(3''-methoxy)-butyl]-amide
1-phenyl-3-methyl-5-pyrazolone - 4' - di - [(3''-methoxy)-butyl]-amide
1-phenyl-3-methyl-5-pyrazolone - 3' - di -[(4''-methoxy)-butyl]-amide
1-phenyl-3-methyl-5-pyrazolone - 2' - di - [(4''-methoxy)-butyl]-amide
1-phenyl-3-methyl-5-pyrazolone - 4' - di - [(4''-methoxy)-butyl]-amide
1-phenyl-3-methyl-5-pyrazolone - 3' - di - [(2'''-ethoxy)-ethyl]-amide
1-phenyl-3-methyl-5-pyrazolone - 2' - di - [(2'''-ethoxy)-ethyl]-amide
1-phenyl-3-methyl-5-pyrazolone - 4' - di - [(2'''-ethoxy)-ethyl]-amide A representative produce is that of the formula

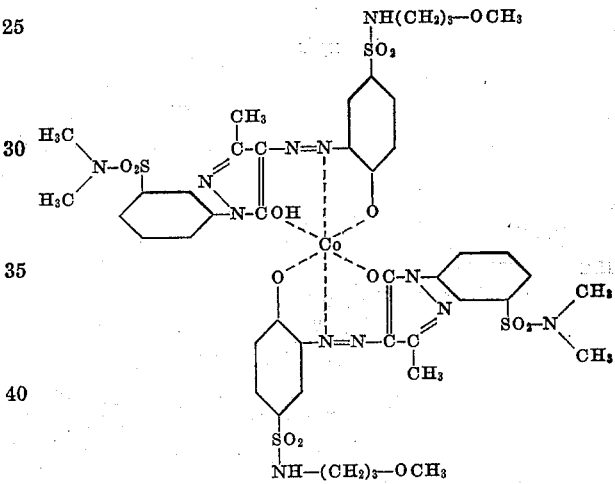

The following table sets forth additional illustrative examples, it being understood that the procedure is analogous to that set forth in Examples 1 and 2, one mol of diazo component being in each case coupled with one mol of azo component and the resultant dyestuff being converted into the metal complex compound:

| Example No. | Diazo component | Azo component | Metal complex compound | Shade of dope-dyed acetate rayon |
|---|---|---|---|---|
| 3 | 1-hydroxy-2-aminobenzene-5-sulfonic acid ethylamide. | 1-phenyl-3-methyl-5-pyrazolone-3'-sulfonic acid dimethylamide | Cr | Red. |
| 4 | 1-hydroxy-2-aminobenzene-5-sulfonic acid methylamide. | ----do---- | Cr | Do. |
| 5 | 1-hydroxy-2-amino-4-chlorobenzene-5-sulfonic acid methylamide. | 1-phenyl-3-methyl-5-pyrazolone-4'-sulfonic acid morpholide. | Cr | Do. |
| 6 | 1-hydroxy-2-amino-4-chlorobenzene-6-sulfonic acid methylamide. | 1-phenyl-3-methyl-5-pyrazolone-3'-sulfonic acid diethylamide. | Cr | Do. |
| 7 | 1-hydroxy-2-aminobenzene-4-sulfonic acid methylamide. | 1-phenyl-3-methyl-5-pyrazolone-4'-sulfonic acid diethylamide. | Cr | Reddish orange. |
| 8 | 1-hydroxy-2-aminobenzene-5-sulfonic acid cyclohexylamide. | 1-phenyl-3-methyl-5-pyrazolone-3'-sulfonic acid dimethylamide. | Co | Yellow-brown. |
| 9 | 1-hydroxy-2-amino-4-methylbenzene-6-sulfonic acid methylamide. | 1-phenyl-3-methyl-5-pyrazolone-4'-sulfonic acid pyrrolidide. | Cr | Red. |
| 10 | 1-hydroxy-2-aminobenzene-4-sulfonic acid methylamide. | 1-phenyl-3-methyl-5-pyrazolone-2'-sulfonic acid pyrrolidide. | Cr | Reddish orange. |
| 11 | ----do---- | ----do---- | Co | Reddish yellow. |
| 12 | 1-hydroxy-2-aminobenzene-4-sulfonic acid-(2'-methoxy)-ethylamide. | 1-phenyl-3-methyl-5-pyrazolone-2'-sulfonic acid dimethylamide. | Co | Do. |
| 13 | 1-hydroxy-2-aminobenzene-4-sulfonic acid-(2'-methoxy)-propylamide. | 1-phenyl-3-methyl-5-pyrazolone-3'-sulfonic acid dimethylamide. | Co | Do. |
| 14 | 1-hydroxy-2-aminobenzene-4-sulfonic acid-(4'-methoxy)-butylamide. | ----do---- | Co | Do. |
| 15 | 1-hydroxy-2-aminobenzene-4-sulfonic acid-(2'-ethoxy)-ethylamide. | ----do---- | Co | Do. |

The following are the formulae of representative products of the foregoing examples.

Example 7

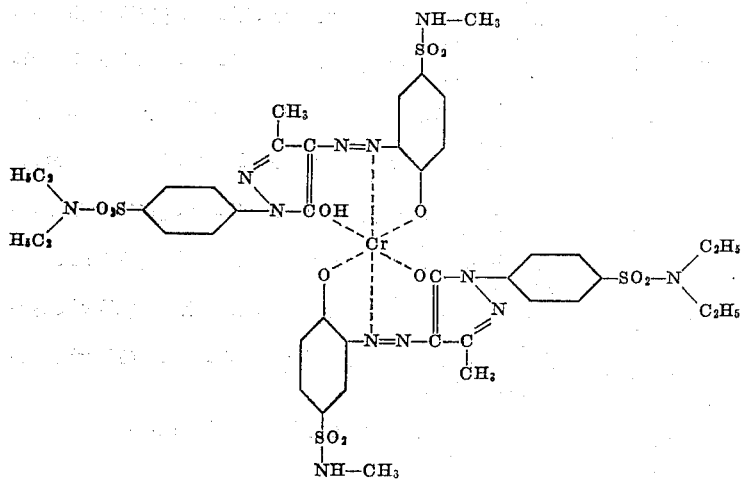

Example 8

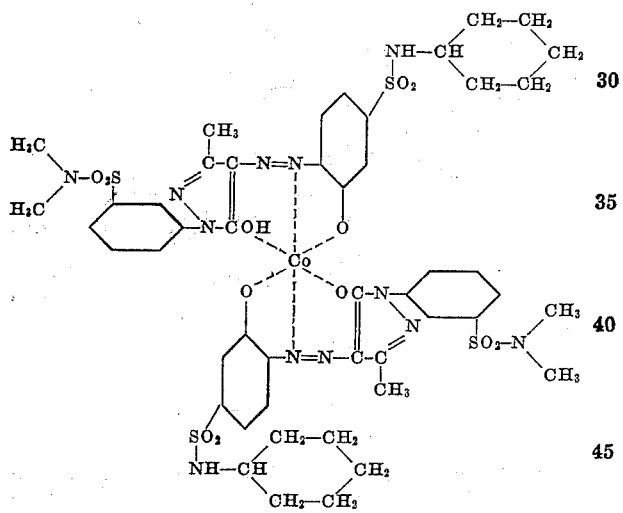

Example 10

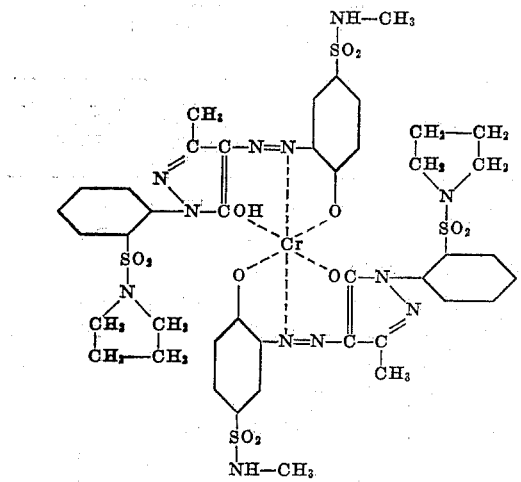

Example 16

100 parts of cellulose acetate with a splittable acetic acid content of 54–55% are added to 300 parts of solvent (e. g. a mixture of 275 parts of acetone and 25 parts of methanol). The mass is stirred and allowed to swell overnight.

On the following day 1 part of the chromiferous azo dyestuff obtained according to Example 1 is dissolved in 60 parts of the same solvent. This solution is added to the cellulose acetate solution and the whole stirred until 60 parts of solvent have evaporated.

After the cellulose acetate solution has been filtered through cotton fabric and a cotton-wool filter, the further course of the operation to the formation of the dyed filament is the same as in the production of undyed cellulose acetate.

Having thus disclosed the invention what we claim is:

The metalliferous azo dye which corresponds to the formula

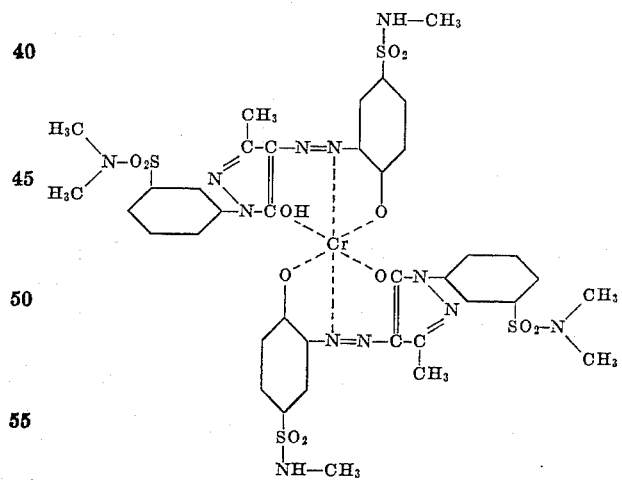

said dyestuff being soluble in acetone to provide a dyed dope from which fast dope-dyed acetate fibers can be spun.

References Cited in the file of this patent
UNITED STATES PATENTS

| | | |
|---|---|---|
| 2,565,898 | Widmer et al. | Aug. 28, 1951 |
| 2,606,185 | Widmer et al. | Aug. 5, 1952 |
| 2,673,199 | Widmer et al. | Mar. 23, 1954 |
| 2,673,201 | Zickendraht et al. | Mar. 23, 1054 |
| 2,727,031 | Zickendraht et al. | Dec. 13, 1955 |

FOREIGN PATENTS

| | | |
|---|---|---|
| 302,544 | Switzerland | Jan. 3, 1952 |
| 512,923 | Belgium | Jan. 17, 1953 |

UNITED STATES PATENT OFFICE

CERTIFICATE OF CORRECTION

Patent No. 2,864,814　　　　　　　　　　　　　　　December 16, 1958

Hans Ruckstuhl

It is hereby certified that error appears in the above numbered patent requiring correction and that the said Letters Patent should read as shown below.

In the heading to the printed specification, between lines 8 and 9, insert -- Claims priority, application Switzerland March 7, 1952 --; in the printed specification, column 3, line 29, for "dyestuffs" read -- dyestuff --.

Signed and sealed this 30th day of June 1959.

(SEAL)
Attest:

KARL H. AXLINE
Attesting Officer

ROBERT C. WATSON
Commissioner of Patents